United States Patent [19]

Grund

[11] Patent Number: 4,831,737

[45] Date of Patent: May 23, 1989

[54] APPARATUS FOR COMPENSATING FOR THE THERMAL EXPANSION OF TWO RELATIVELY MOVABLE MACHINE PARTS

[75] Inventor: Peter Grund, Heinsberg, Fed. Rep. of Germany

[73] Assignee: MAHO Aktiengesellschaft, Pfronten, Fed. Rep. of Germany

[21] Appl. No.: 81,879

[22] Filed: Aug. 4, 1987

[30] Foreign Application Priority Data

Aug. 13, 1986 [DE] Fed. Rep. of Germany ....... 3627546

[51] Int. Cl.⁴ .............................................. G01B 11/04
[52] U.S. Cl. .......................................... 33/702; 33/707
[58] Field of Search .............. 33/125 T, 125 A, 125 C, 33/125 R

[56] References Cited

U.S. PATENT DOCUMENTS

| 2,956,344 | 10/1960 | Rantsch | 33/174 |
| 3,045,510 | 7/1962 | Brainard | 77/5 |
| 4,549,354 | 10/1985 | Affa et al. | 33/125 T |
| 4,554,741 | 11/1985 | Affa | 33/125 T |
| 4,603,480 | 8/1986 | Sakagami | 33/125 T |

FOREIGN PATENT DOCUMENTS

| 1010802 | 6/1957 | Fed. Rep. of Germany. |
| 2008813 | 9/1970 | Fed. Rep. of Germany. |
| 2450322 | 5/1976 | Fed. Rep. of Germany. |
| 2558625 | 7/1977 | Fed. Rep. of Germany. |
| 3309722 | 12/1983 | Fed. Rep. of Germany. |
| 3316081 | 11/1984 | Fed. Rep. of Germany .... 33/125 T |
| 47092 | 9/1936 | France ............................. 33/125 T |
| 135835 | 5/1979 | German Democratic Rep. ... 33/125 T |

Primary Examiner—William D. Martin, Jr.
Attorney, Agent, or Firm—Baker, Maxham, Jester & Meador

[57] ABSTRACT

An apparatus for compensating for the thermal expansion of two machine parts which are relatively movable in longitudinal guideways. The apparatus comprises a rule, a support rod longitudinally disposed on the movable machine part for supporting the rule, and an electric scanning head mounted on the stationary machine part. The support rod is made of a material which exhibits negligible thermal expansion in the concerned temperature range. The forward end of the support rod is rigidly secured to the forward end of the movable machine part while the rear end thereof is movably guided on that machine part. The rear end of the rule is fixed to the rear end of the support rod. The scanning head is disposed on the stationary machine part in such a way that any thermal expansion of the stationary machine part cannot affect the location of the scanning head.

4 Claims, 1 Drawing Sheet

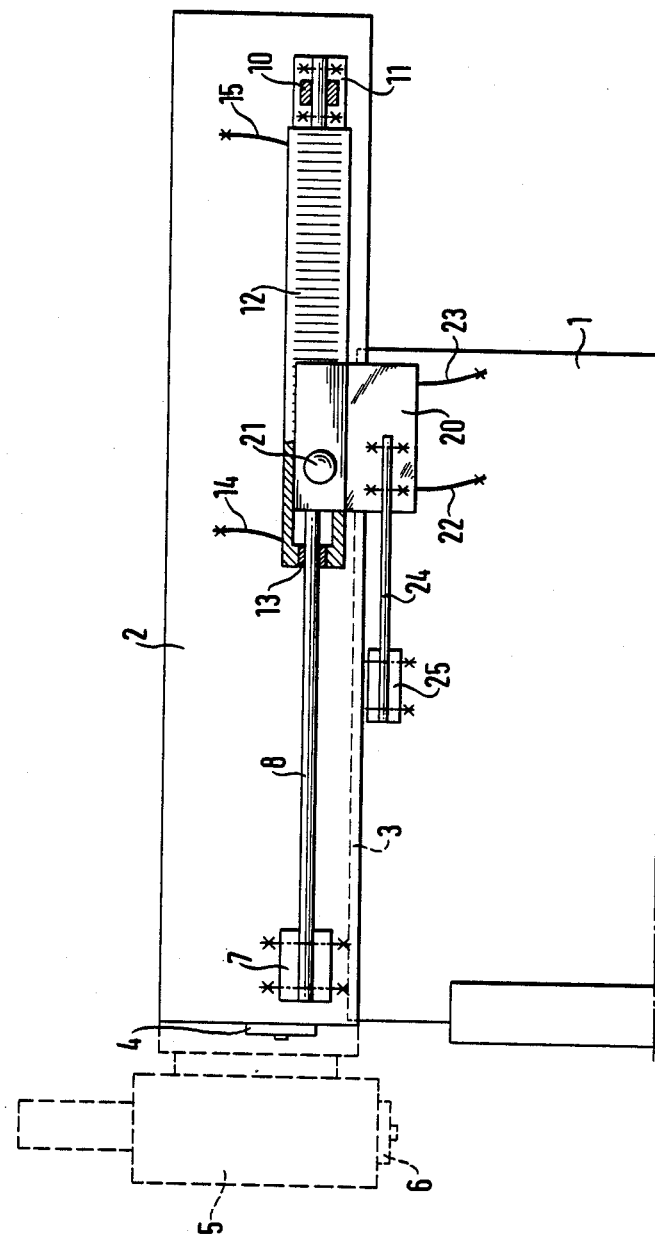

APPARATUS FOR COMPENSATING FOR THE THERMAL EXPANSION OF TWO RELATIVELY MOVABLE MACHINE PARTS

FIELD OF THE INVENTION

The invention is directed to an apparatus for compensating for the thermal expansion of two machine parts relatively movable in longitudinal guideways, the apparatus including a support rod which is longitudinally disposed on the movable machine part for supporting a rule carrying measuring indices and an electro-optical scanning head mounted on the stationary machine part.

BACKGROUND OF THE INVENTION

In order to satisfy the high precision demands made in respect of modern machine systems, in particular program controlled machine tools, it is necessary for the employed measuring systems to operate as error-free as possible and independently of varying operating conditions. In order to prevent contamination of the measuring systems as far as possible, these systems are normally disposed quite remote from the operating range of the machine. But due to thermal expansion effects of the individual machine parts caused by temperature variations, which occur for example during start-up and until an approximately constant operating temperature has been reached, displacements are thereby caused between the work spindle or the machining tool and the measuring system.

German Pat. No. 2,450,322 discloses an apparatus generally of the specified kind for compensating for thermal expansion of a part of a machine tool, in which a strain rod carrying the actual rule is mounted in close engagement on a side wall of a slide, for example, a headstock, which is exposed to the temperature variations. The material of the strain rod is selected such that in the respectively occurring temperature ranges the thermal expansion of the strain rod is greater by a certain amount than that of the slide. The rear end of the strain rod is rigidly mounted on the rear end of the slide or headstock, which rear end is heated only slightly. Upon heating of the slide or headstock, such as during start-up, the increased elongation of the strain rod will compensate for the elongation of the machine parts projecting beyond the slide, for example, of a vertical milling head attached to the headstock, which elongation cannot be directly detected by the measuring system. The rule carrying the indices for a scanning head secured to the stationary machine part is secured with its forward end to the forward end of the strain rod by use of a thermally insulating intermediate layer which insulates the rule relative to the heated parts and is intended to prevent thermal expansion of the rule.

But with this prior compensating system problems may arise due to the fact that the strain rod is fixedly joined to the machine part only at its rear end while its forward end is merely retained in a guide means mounted on the headstock. Since the strain rod therefore contacts the machine part so as to be relatively movable in longitudinal direction, a continuous positive contact along the entire length of the strain rod cannot be achieved, thus resulting in a not exactly defined heat transmission between the machine part (headstock) and the strain rod. Especially due to changes of length of the strain rod, which is made from a mechanically relatively flexible material such as aluminum, there is the risk upon assembly or during operation that the continuous surface contact with the machine part is disturbed, thus resulting in significant changes of the heat transmission and therefore of the strain behavior of the rod. Moreover, the length dimension of the respective strain rods must also be matched with the different machine parts or types of machines.

For compensating for the thermal expansion of a headstock it is known from German Pat. No. 1,010,802 to provide a strain rod in parallel to the headstock and to securely fix it on one side to the machine stand and on the other side to a machine part carrying the headstock. With that structure, upon a change of temperature the entire headstock or the machine part carrying the same will be displaced due to the corresponding thermal expansion of the strain rod. This compensating system is extremely expensive, because the strain rod is integrated in the machine itself. Retrofitting of machine tools with this compensating system is not reasonably possible.

SUMMARY OF THE INVENTION

It is an important object of the invention to provide an apparatus for compensating for the thermal expansion of two machine parts which are relatively movable in longitudinal guideways, especially of a headstock on the stand of a milling machine, which apparatus operates with an improved response and higher compensating accuracy while being of simple design.

The specified object, and others, are achieved in accordance with the invention in that the support rod secured to the movable machine part consists of a material which exhibits negligible thermal expansion in the concerned temperature range. The forward end of the support rod is rigidly secured to the forward end of the movable machine part and the rear end of the rod is movably guided on the movable machine part. The rear end of the rule is fixedly secured to the rear end of the support rod.

Due to rigid connection between the forward end portions of the movable machine part and the support rod, the support rod will be taken along by the machine part which expands upon heating in the forward direction. Since the support rod itself is resistant to temperature variations in the concerned temperature ranges and therefore has substantially constant length, the rule fixed to the rear end thereof will be displaced by exactly the amount of the thermal elongation of the machine part, thus resulting in exact compensation of the thermal expansion of the machine part. In order also to take into account the thermal expansion of a further machine member attached to the movable machine part, for example, a vertical milling head attached to a headstock, wherein the thermal expansion of such a member cannot be directly detected, the relatively slight elongation of the rule having its rear end fixedly connected to the rear end of the support rod is utilized in accordance with the invention. It is an essential advantage of this compensating system that the heat transmission between the machine part and the support rod has no significant influence on the accuracy of compensation, because the length of the support rod remains substantially unchanged within the concerned temperature range due to the chosen material and because the entire support rod is taken along by the expanding end portion of the machine part.

The accuracy of compensation is further substantially and unexpectedly improved in respect of the prior art by the feature that the scanning head is secured to the free end of a second support rod which, in the concerned temperature range, exhibits substantially no thermal expansion and therefore has constant length. The other end of the second support rod is secured to the stationary machine part in the plane thereof which is neutral in respect of expansion—in case of symmetrically designed machine parts this plane corresponds to the center plane—so that any thermal expansion of the stationary machine part will not affect the position of the scanning head.

BRIEF DESCRIPTION OF THE DRAWING

The objects, advantages and features of this invention will be more readily understood from the following detailed description when read in conjunction with the accompanying drawing, the single figure of which is a schematic side view showing the upper portion of a universal milling machine including the temperature compensating apparatus of the invention.

DESCRIPTION OF THE PREFERRED EMBODIMENTS

With reference now to the drawing, headstock 2 is mounted on stand 1 and is guided for motor-driven movement in horizontal guideways 3. Rotatably driven horizontal spindle 4 is supported in headstock 2. For performing machining operations in the vertical direction, vertical milling head 5 (indicated in dashed lines) having driven vertical spindle 6 can be attached to the front face of headstock 2, as is known to those skilled in this art.

Support rod 8 is secured by bolts or equivalent means to the forward end portion of headstock 2 by fixing means 7 such as a mounting plate. In the typically occurring temperature range, between normal room temperature and about 80° C., the support rod is practically neither extended nor subjected to any change of shape. Bunched carbon fibres in a suitable matrix have been found suitable as material for the support rod. The rear end of support rod 8 is retained for longitudinal movement along slideway 10 on headstock 2, the support rod being bolted by fixing means 11 to the rear end of rule 12. In the illustrated embodiment support rod 8 protrudes along its entire length through hollow rule 12, slideway 13 being provided between both members at the front end of rule 12. Rule 12 is suspended from leaf springs 14, 15 on a sidewall of headstock 2, the leaf springs during normal operation exhibiting a certain rearwardly directed spring force on rule 12 and serving to dampen vibrations generated in operation.

Scanning head 20 having optical system 21 and being electrically connected to the program control unit (not illustrated) is used for scanning the measuring indicia on rule 12. The casing of the scanning head is secured by means of two leaf springs 22, 23 to a side wall of stand 1. Moreover, scanning head 20 is rigidly connected to one end of a further support rod 24 which is made of the same material as support rod 8 and exhibits substantially no expansion in the concerned temperature range. The other end of support rod 24 in the illustrated embodiment is rigidly secured by fixing means 25 in the plane of the stand which, because of the construction, is neutral in respect of thermally caused extension.

The operation of the afore-described thermal expansion compensating system will now be described. When headstock 2, during start-up, is heated from normal ambient temperature to its operating temperature (about 50° C.), thermal expansion will normally occur, especially in the front portion thereof. The working point of the tool to be used in operation with horizontal spindle 4, or the spindle axis upon operation with vertical spindle 6, will be displaced due to thermal expansion toward the left as viewed in the drawing by an amount of a few tenths of millimeters. Since support rod 8, with its forward end in the vicinity of the work spindle, is secured to the headstock by fixing means 7, the support rod will be taken along by the headstock when elongation occurs. Due to the resistance of support rod 8 to length changes caused by temperature variations, the rear end of the support rod, together with rule 12 mounted thereon, will be displaced in slideway 10 by the same amount of elongation so that the measuring indicia on rule 12 will also be moved in the direction of elongation of the headstock.

Compensation of the extremely slight elongation of a tool inserted in the horizontal spindle, including the machine taper, or of the vertical head 5 including the attachments on the spindle head, is not fully taken into account by the above-described system. But this very minimal elongation will be compensated by the relatively slight thermal expansion of rule 12, which is secured with its right-hand end, as viewed in the drawing, to support rod 8, resulting in a slight further displacement of the measuring indicia in the direction of elongation of the headstock.

Heating to operating temperature as well as temperature variations during operation are not confined to headstock 2 but will also occur in stand 1. The thermal expansion of the stand effective in the longitudinal direction of the headstock must not be neglected in view of the high demands on the accuracy of modern machine tools. This length change is compensated in accordance with the embodiment of the invention by mounting scanning head 20 on further support rod 24 fixed in the center plane of the stand.

The invention is not limited to the illustrated embodiment. For example, rule 12 can either be in direct and large-surface contact with a side wall of headstock 2, or intermediate layers may be provided between the rule and the side wall of the headstock so as to cause controlled heat transmission from the headstock to the rule. The latter feature permits the use of rules of identical length for different-length headstocks or other machine parts and their disposition in any desired section of the headstock. Furthermore, support rod 24 may also be secured at its forward end directly to the forward edge of stand 1, whereby due to a suitable length of support rod 24 scanning head 20 can be positioned as desired in accordance with the selected location of the rule. It is also possible to reverse the arrangement of rule and scanning head, in which case the scanning head is mounted on the headstock while the rule is mounted on the stand.

In view of the above description it is likely that modifications and improvements will occur to those skilled in the applicable art which are within the scope of the appended claims.

What is claimed is:

1. An apparatus for compensating for thermal expansion of two machine parts which are relatively movable in longitudinal guideways with respect to each other and operate within a predetermined temperature range, said apparatus comprising:

a support rod longitudinal disposed on one side of said relatively movable machine parts, said support rod being made from materials having negligible thermal expansion in the predetermined temperature range;
means fixing one end of said support rod to said one machine part;
guide means on said one machine part for supporting the other end of said support rod for sliding motion with respect to said one machine part;
a rule having measuring indicia thereon fixed to said other end of said support rod; and
an electro-optical scanning head mounted on the other of said relatively movable machine parts and adapted to detect said indicia on said rule.

2. The apparatus recited in claim 1, wherein said support rod is made from carbon fibers.

3. The apparatus recited in claim 1, and further comprising:

a second support rod having one end fixed to said other machine part in a plane thereof which is neutral with respect to thermally caused extension;
said scanning head being mounted to the other end of said second support rod;
said second scanning rod being made from materials having negligible thermal expansion in the predetermined temperature range.

4. The apparatus recited in claim 2, and further comprising:

a second support rod having one end fixed to said other machine part in a plane thereof which is neutral with respect to thermally caused extension;
said scanning head being mounted to the other end of said second support rod;
said second scanning rod being made from materials having negligible thermal expansion in the predetermined temperature range.

* * * * *